United States Patent Office 2,984,664
Patented May 16, 1961

2,984,664
PROCESS FOR PREPARATION OF PENTAMETHINCYANINES
Douglas James Fry, John David Kendall, and Anthony John Morgan, all of Ilford, England, assignors to Ilford Limited, Ilford, England, a British company
No Drawing. Filed May 6, 1959, Ser. No. 811,284
Claims priority, application Great Britain May 14, 1958
3 Claims. (Cl. 260—240.5)

This invention relates to pentamethincyanines, also called dicarbocyanines, and more particularly to improvements in the manufacture thereof.

Pentamethincyanines are of utility as optical sensitisers for photographic silver halide emulsions, extending the sensitivity thereof to the red, far-red and infra-red regions of the spectrum. They also have therapeutic value, particularly as anthelmintics; the compound bis-2-(3-ethylbenzthiazole) pentamethincyanine in particular is a very valuable broad spectrum anthelmintic.

It is an object of the present invention to provide a new process for the manufacture of pentamethincyanines, the said process affording yields of such products which are in general higher than those obtained by the processes hitherto described in the literature and which may be as high as 90% or even more in the case of bis-2-(3-ethylbenzthiazole) pentamethincyanine referred to above.

According to the present invention a process for the production of a pentamethincyanine comprises reacting together, in the presence of an acid binding agent, essentially one molecular equivalent of a pyrimidine quaternary salt of the Formula I:

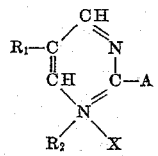

with essentially two molecular equivalents of a quaternary salt of the general Formula II:

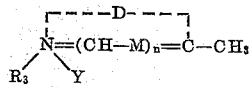

wherein $R_1$ is a hydrogen atom or an alkyl, aryl or aralkyl group, $R_2$ is an alkyl, aryl or aralkyl group, $R_3$ is an alkyl, aryl, aralkyl, hydroxyalkyl or carboxyalkyl group, A is a hydrogen atom or a monovalent substituent, e.g. halogen, alkyl, aryl, aralkyl, alkoxy, alkylthio, aralkoxy, aryloxy, arylthio, amino, mono- or di-alkyl, aralkyl- or arylamino, M is a nitrogen atom or a —CH= group, X and Y are acid radicals, e.g. halogen, sulphate or p-toluene sulphonate, D is the residue of a five-membered or six-membered heterocyclic ring and $n$ is nought or one.

The reaction apparently takes place by fission of the pyrimidine ring thus:

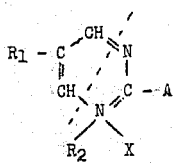

and the products obtained conform to the general Formula III:

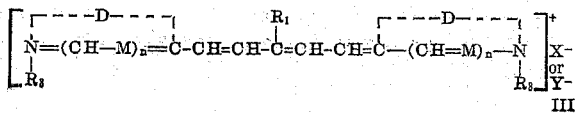

where the symbols have the meanings assigned to them above.

Where, in the foregoing, reference is made to an alkyl, alkoxy or alkylthio group, the alkyl residue preferably contains up to 4 carbon atoms, i.e. methyl, ethyl, propyl, butyl and isomers of these latter. Where reference is made to aralkyl groupings these are preferably benzyl but may be naphthyl methyl. Where reference is made to aryl groups these are preferably phenyl or naphthyl or corresponding groups having nuclear substituents.

The residue D may be selected so that the ring system is any one of those well known for use in cyanine dyes. These include five-membered and six-membered heterocyclic nuclei such as thiazoles, oxazoles, selenazoles and their polycyclic homologues of the benzene and naphthalene series, e.g. benzthiazole and naphthathiazole, pyridine and its polycyclic homologues such as quinoline and α- and β-naphthoquinolines, indolenines, diazines such as 4-alkyl pyrimidines and quinazolines, diazoles such as 1:3:4-thiadiazole, thiazolines, oxazolines, selenazolines, pyrazolenines and iminazolenines. The polycyclic compounds of these series may be substituted in the benzene rings, e.g. by alkyl, aryl, aralkyl, amino, alkyl- or aryl-substituted amino, hydroxy, alkoxy and methylene dioxy groups, or by halogen atoms.

The reaction may be carried out in a solvent which is also a binding agent, e.g. pyridine. However, for the production of the important compound bis-2-(3-ethylbenzthiazole) pentamethincyanine it is preferred to work in an alcoholic solvent medium, e.g. methanol or ethanol, and with triethylamine as the acid binding agent. For the production of compounds where D is a benzoxazole residue or an indolenine residue, the preferred solvent is acetic anhydride and the acid binding agent employed is then preferably a tertiary amine such as triethylamine.

It has been noted that when using a reactant of general Formula I in which A is an alkylthio or arylthio group, there is sometimes obtained, as a by-product, a small quantity of the unsymmetrical monomethin pyramido cyanine of the Formula IV:

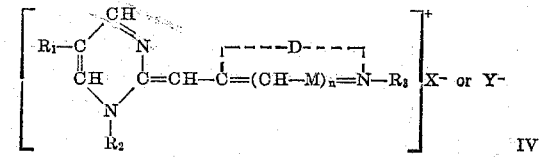

However, this may readily be removed by extracting the crude product of the reaction with water, in which the compounds of Formula IV are very soluble but the compounds of Formula III are not.

The following are illustrative methods for the production of two intermediates of general Formula I:

2-METHYLTHIO PYRIMIDINE METHIODINE 2-methylthiopyrimidine (12.6 g.) and dry methyl iodide (12.6 ml.) were mixed and refluxed on a water bath for 12 hours. The solid product was ground with dry ether, collected, washed with dry ether and dried. The quaternary salt was obtained as a greenish-yellow solid, M.Pt. 152–153° C., yield 25.8 g. (96.3% theoretical).

2-AMINOPYRIMIDINE METHIODIDE 2-amino pyrimidine (3.8 g.), dry methyl iodide (3.8 ml.) and dry benzene (20 ml.) were refluxed for 24 hours on a water bath. A white solid began to separate after a few minutes and continued to increase in bulk during heating. The mixture was cooled in ice-water and the solid filtered off, washed with a little dry benzene and dried. The quaternary salt was obtained as a white solid, M.Pt. 248–249° C. (d), yield 9.4 g. (99% theoretical).

The following examples will serve to illustrate the invention:

EXAMPLE 1

*Bis 2-(3-ethylbenzthiazole) pentamethincyanine iodide*

2-methyl benzthiazole ethiodide (3.05 g. 2 mols.), 2-methylthio pyrimidine methiodide (1.34 g. 1 mol.) and ethanol (30 ml.) were mixed and warmed into solution on a water bath. Triethylamine (1.4 ml.) was added, a green colour developed immediately and dye bumped out of solution. After refluxing the mixture for a further 20 minutes it was cooled in ice-water and the dye filtered, washed with a little ethanol and ether, and dried in an oven. The product was obtained as small light green crystals with a bronze reflex, M.Pt. 257° C. (d). The yield was 2.36 g., 91.2% theoretical. The M.Pt. was not elevated on recrystallisation of the dye from methanol.

EXAMPLE 2

*Bis 2-(3-ethylbenzthiazole) pentamethincyanine iodide*

A mixture of 2-methyl benzthiazole ethiodide (1.32 g. 2 mols.), 2-methylthio pyrimidine methiodide (0.58 g. 1 mol.) and pyridine (10 ml.) was boiled under reflux for 30 minutes. The deep blue reaction mixture was cooled in ice-water and the dye which separated was filtered, washed with a little ethanol and ether and dried. The product was obtained as small dark green crystals with a light green reflex, M.Pt. 254–255° C. (d). A second crop was obtained from the mother liquors by addition of ether.

EXAMPLE 3

*Bis 2-(3-methylbenzthiazole) pentamethincyanine iodide*

2-methyl benzthiazole methiodide (2.91 g. 2 mols.), 2-methylthio pyrimidine methiodide (1.34 g. 1 mol.) and ethanol (45 ml.) were mixed and heated to boiling on a water bath. Addition of triethylamine (1.4 ml.) gave a purple solution which rapidly became blue-green with immediate precipitation of dye. The mixture was boiled under reflux for 20 minutes, the product cooled in ice-water, filtered, washed with a little ethanol and ether, and dried. The dye was obtained as blue-green fluffy crystals, M.Pt. 265.5–268° C. (d). A second crop was obtained from the filtrate.

EXAMPLE 4

*Bis 2-(3-methylbenzthiazole) γ-methylpentamethincyanine toluene-p-sulfonate*

2-methyl benzthiazole (2.98 g.), 2-methylthio-5-methyl pyrimidine (1.4 g.) and methyl toluene p-sulphonate (7.44 g.) were mixed and fused for 3 hours at 130° C. in an oil bath. The fusion product was dissolved by warming in ethanol (20 ml.) and triethylamine (2.8 ml.) added. The solution, which became blue-green, was boiled under reflux for 1 hour, cooled in ice-water, and the dye which separated was filtered, washed with a little ethanol and ether and dried. The crude dye (3.4 g.) was crystallised from ethanol as dark blue fluffy crystals, M.Pt. 224–226° C. (d), yield 2.6 g. A further crop of dye was obtained as iodide by adding hot aqueous potassium iodide solution to the crude mother liquors. The iodide (2.0 g.) had M.Pt. 260–270° C. (d). Total yield of dye 98.5% theoretical. The dye behaves as a feeble sensitiser when added to a silver iodobromide emulsion, showing a maximum at 700 mμ.

EXAMPLE 5

*Bis 2-(3-methylbenzthiazole) γ-methylpentamethincyanine iodide*

2-methyl benzthiazole methiodide (1.0 g.), 2-methylthio-5-methyl pyrimidine methiodide (0.5 g.), and ethanol (30 ml.) were mixed and dissolved by warming on a water bath. On the addition of triethylamine (0.5 ml.) a green colour developed and dye bumped out of solution. After refluxing for 20 minutes the mixture was cooled in ice-water and the dye filtered, washed with a little ethanol and ether, and dried. The crude product was obtained as a dark green powder, M.Pt. 280–290° C. (d).

EXAMPLE 6

*Bis 2-(3-methyl-5:6-dimethoxybenzthiazole) γ-methylpentamethincyanine toluene-p-sulphonate*

2-methyl-5:6-dimethoxy benzthiazole (1.8 g.), 2-methylthio-5-methyl pyrimidine (0.6 g.) and methyl toluene-p-sulphonate (3.5 g.) were mixed and fused for 3 hours at 140° C. in an oil bath. The product was dissolved in hot ethanol (50 ml.) and triethylamine (1.4 ml.) added, when a green colour developed. The mixture was boiled under reflux for 1 hour, cooled in ice-water and the product filtered, washed with a little ethanol and ether and dried. The dye was obtained as a dark green solid which crystallised from water as green crystals with a bronze reflex, M.Pt. 230° C. (d).

EXAMPLE 7

*Bis 2-(1-methylquinoline) γ-methylpentamethincyanine bromide*

Quinaldine (0.65 g.), 2-methylthio-5-methyl pyrimidine (0.3 g.) and methyl toluene-p-sulphonate (1.75 g.) were mixed and fused for 3 hours at 140° C. in an oil bath. The product was dissolved in hot ethanol (25 ml.) and triethylamine (0.7 ml.) added when a green colour developed. After boiling under reflux for 1 hour the reaction mixture was poured into hot aqueous potassium bromide solution and cooled in ice-water. The crude dye was filtered, washed with a little ethanol and ether and dried. It was boiled out with water and the residue crystallised from ethanol to give the dye as green crystals with a bronze reflex, M.Pt. 270° C. (d).

EXAMPLE 8

*Bis 2-(3-ethylbenzethiazole) pentamethincyanine iodide*

A mixture of 2-methyl benzthiazole ethiodide (3.05 g.), 2-amino pyrimidine methiodide (1.19 g.) and ethanol (30 ml.) was warmed on a water bath until the solids had dissolved. On the addition of triethylamine (1.4 ml.) a blue colour developed which intensified on further heating. Dye separated from solution after a few minutes, and after boiling under reflux for 30 minutes the reaction mixture was cooled in ice-water and filtered. The dye was washed with a little ethanol and ether, and dried to give the pentamethincyanine dye as green crystals with a bronze reflex, M.Pt. 257° C. (d). The yield was 2.22 g., 85.7% of the theoretical.

EXAMPLE 9

*Bis 2-(1-methylquinoline) pentamethincyanine iodide*

Quinaldine methiodide (2.85 g.), 2-methylthio pyrimidine methiodide (1.34 g.) and ethanol (35 ml.) were mixed and warmed into solution on a water bath. On the addition of triethylamine (1.4 ml.) a transient purple colour developed which faded rapidly to a greenish-brown as dye bumped out of solution. After refluxing for 30 minutes the reaction mixture was cooled in ice-water and filtered, the dye was washed with a little ethanol and ether and dried in an oven. The pentamethincyanine dye was obtained as greenish-brown crystals with a bronze reflex, M.Pt. 247° C. (d). The crude dye (1.43 g.) was warmed with water (140 ml.) at 90° C. for 30 minutes, filtered hot and then warmed with ethylene glycol monomethyl ether (70 ml.) at 90° C. for 30 minutes. After cooling to 0° C. the dye was filtered, washed with a little ethanol and ether and dried. The purified dye was obtained as brown crystals with a bronze reflex, M.Pt. 258.5–260° C. (d). The yield was 1.1 g. The dye acted as a desensitiser when added to a silver iodobromide emulsion.

EXAMPLE 10

*Bis 2-(3-ethylbenzthiazole) pentamethincyanine iodide*

2-methyl benzthiazole (1.49 g.), 2-amino pyrimidine (0.48 g.) and ethyl toluene p-sulphonate (3 g.) were mixed and fused for 4 hours at 140° C. in an oil bath. A blue colour developed, which intensified after the fusion product had been dissolved in hot ethanol (45 ml.) and triethylamine (1.4 ml.) added. The mixture was boiled under reflux for 30 minutes and the reaction mixture was poured into hot aqueous sodium iodide solution (40 ml. of 5% solution), when the dye separated rapidly from the hot liquors. These were cooled in ice-water and the dye filtered, washed with a little ethanol and ether, and dried to give dark green crystals. Recryst from methanol, M.Pt. 257° C. (*d*).

EXAMPLE 11

*Bis 2-(3-ethylbenzthiazole) pentamethincyanine iodide*

2-methylbenzothiazole ethiodide (0.61 g.) and pyrimidine methiodide (0.22 g.) were dissolved in hot ethanol (5 ccs.) and to the solution was added triethylamine (0.3 cc.). Immediately a blue colour developed and the dye separated from solution. After heating for a further 10 minutes the suspension was cooled and the dye (0.57 g.) filtered off and washed with alcohol and ether. It crystallised from 85 cc. methanol as grass-green needles (0.41 g.), M.Pt. 251° C. (*d*). The yield of the crystallised dye was 81%.

EXAMPLE 12

*Bis 2-(1:3:3-trimethylindolenine) pentamethincyanine perchlorate*

2:3:3-trimethyl indolenine methiodide (3.01 g.) and 2-methylthio pyrimidine (1.34 g.) were dissolved in warm acetic anhydride (25 ml.). On the addition of triethylamine (1.4 ml.) a green colour developed which changed to blue. The mixture was boiled for 45 minutes and poured into hot aqueous sodium perchlorate solution (20 ml. of 10% solution), the dye separating immediately. After cooling in ice-water the product was filtered off, washed with a little ethanol and ether and dried. The crude dye was obtained as dark blue crystals with a bronze reflex, M.Pt. 195° C. (*d*). Crystallisation from methanol (1 in 50) gave purple-blue crystals with a silver reflex, M.Pt. 232° C. (*d*). Some dye remained as a boiled out sample, M.Pt. 236° C. (*d*).

EXAMPLE 13

*Bis 4-(1-methylquinoline) pentamethincyanine iodide*

Lepidine methiodide (2.85 g.) and 2-methylthio pyrimidine methiodide (1.34 g.) were dissolved in warm ethanol (30 ml.) and triethylamine (1.4 ml.) added. A purple colour developed which faded rapidly as dye separated from solution. The mixture was refluxed for 30 minutes, then cooled in ice-water and the dye filtered off, washed in a little ethanol and ether, and dried. The crude dye (1.64 g.) was obtained as a dark brown solid, M.Pt. 206–209° C. (*d*). This was crystallised from methanol (165 ml.) as dark brown crystals, M.Pt. 223–227° C. (*d*). The dye acted as a desensitiser when added to a silver iodobromide emulsion.

EXAMPLE 14

*Bis 2-(3-ethyl-5-chlor benzothiazole) pentamethincyanine iodide*

2-methyl-5-chlor benzothiazole ethiodide (3.39 g. 2 mols.), 2-methylthio pyrimidine methiodide (1.34 g. 1 mol.) and ethanol (30 ml.) were mixed and warmed into solution on a water bath. Triethylamine (1.4 ml.) was added, a purple colour developed which was immediately followed by a green colour and precipitation of dye. After refluxing the mixture for a further 30 minutes it was cooled in ice-water and the dye filtered, washed with a little ethanol and ether, and dried in an oven. The crude dye (2.7 g.) was warmed with water (270 ml.) for 30 minutes at 80° C., filtered hot and washed with water, ethanol and ether, the solid being further purified by warming with ethylene glycol monomethyl ether (135 ml.) for 30 minutes at 80° C. The mixture was cooled to 0° C. and filtered, the dye being obtained as dark green crystals, M.Pt. 297–298.5° C. (*d*). The yield was 2.22 g.

The dye behaves as a very feeble sensitiser, extending the sensitivity of a silver iodobromide emulsion to 720 m$\mu$ with a maximum at 710 m$\mu$.

EXAMPLE 15

*Bis 4-(1-methyl pyrimidine) pentamethincyanine iodide*

4-methyl pyrimidine methiodide (2.36 g. 2 mols.), 2-methylthio pyrimidine methiodide (1.34 g. 1 mol.) and ethanol (20 ml.) were mixed and warmed into solution on a water bath. Triethylamine (1.4 ml.) was added, a purplish-blue colour developed which changed to blue-green almost immediately. Some dye bumped out of the hot solution during a reflux of 40 minutes, after which it was cooled in ice-water and the dye filtered, washed with a little ethanol and ether, and dried in an oven. The crude dye (0.56 g.) was crystallised from methanol (35 ml.) as dark brown crystals, M.Pt. 216–219° C. (*d*).

The dye behaves as a feeble sensitiser, extending the sensitivity of a silver iodobromide emulsion to 720 m$\mu$ with a maximum at 680 m$\mu$.

EXAMPLE 16

*Bis 2-(3-methyl-6:7-benzbenzothiazole) pentamethincyanine iodide*

2-methyl α-naphthathiazole methiodide (1.705 g. 2 mols.), 2-methylthio pyrimidine methiodide (0.67 g. 1 mol.) and ethanol (30 ml.), were mixed and warmed into solution on a water bath. Triethylamine (0.7 ml.) was added; a strong purple colour developed which faded rapidly as a very insoluble dye separated. After refluxing the mixture for a further 15 minutes it was cooled in ice-water and the dye filtered, washed with a little ethanol and ether, and dried in an oven. The crude dye (1.44 g.) was warmed with water (140 ml.) for 30 minutes at 80° C., filtered hot and washed with water, ethanol and ether, the solid being further purified by warming with ethylene glycol monomethyl ether (70 ml.) for 30 minutes at 80° C. The mixture was cooled to 0° C. and filtered, the dye being obtained as golden green crystals, M.Pt. 263–264° C. (*d*). The yield was 0.58 g.

The dye behaves as a very feeble sensitiser, extending the sensitivity of a silver iodobromide emulsion to 755 m$\mu$ with a maximum at 740 m$\mu$.

EXAMPLE 17

*Bis 2-(3-methyl-4:5-benzbenzothiazole) pentamethincyanine iodide*

2-methyl β-naphthathiazole (1.99 g. 2 mols.) and methyl toluene-p-sulphonate (1.86 g. 2 mols.) were mixed and fused for 4 hours at 150° C. in an oil bath. The solid product was allowed to cool and treated with 2-methylthio pyrimidine methiodode (1.34 g. 1 mol.) and ethanol (30 ml.). The mixture was warmed into solution and triethylamine (1.4 ml.) added; a purple colour developed which rapidly disappeared as a green dye bumped out of solution. After refluxing the mixture for a further 15 minutes it was cooled in ice-water and the dye filtered, washed with a little ethanol and ether, and dried in an oven. The crude dye (1.4 g.) was warmed with water (140 ml.) for 30 minutes at 80° C., filtered hot and washed with water, ethanol and ether, the solid being further purified by warming with ethylene glycol monomethyl ether (70 ml.) for 30 minutes at 80° C. The mixture was cooled to 0° C. and filtered, the dye being obtained as fluffy bright green crystals with a golden reflex, M.Pt. 218–220° C. (d). The yield was 1.2 g.

The dye behaves as a very feeble sensitiser, extending the sensitivity of a silver iodobromide emulsion to 755 mμ with a maximum at 740 mμ.

EXAMPLE 18

*Bis 2-[3-(β-hydroxyethyl) benzothiazole]-γ-methyl pentamethincyanine iodide*

2-methyl benzothiazole β-hydroxy ethobromide (2.74 g. 2 mols.), 2-methylthio-5-methyl pyrimidine methiodide (1.41 g. 1 mol.) and ethanol (30 ml.) were mixed and warmed into solution on a water bath. Triethylamine (1.4 ml.) was added, a purple colour developed but immediately changed to blue and this faded rapidly as dye bumped out of solution. After refluxing the mixture for a further 30 minutes it was cooled in ice-water and the dye filtered, washed with a little ethanol and ether, and dried in an oven. The crude dye (2.05 g.) was warmed with water (200 ml.) for 30 minutes at 80° C., filtered hot and washed with water, ethanol and ether, the product being obtained as green crystals with a silvery-green reflux, M.Pt. 257–258° C. (d). The yield was 1.73 g., 66.8% theoretical.

The dye extends the sensitivity of a silver iodobromide emulsion to 735 mμ with a maximum at 705 mμ.

EXAMPLE 19

*Bis 2-[3-(β-hydroxethyl)benzothiazole]-γ-phenyl pentamethincyanine iodide*

2-methyl benzothiazole β-hydroxy ethobromide (2.74 g. 2 mols.), 2-methylthio-5-phenyl pyrimidine methiodide (1.72 g. 1 mol.) and ethanol (30 ml.) were mixed and warmed into solution on a water bath. Triethylamine (1.4 ml.) was added, a green colour developed and dye bumped out of solution after refluxing had been continued for 10 minutes. After another 20 minutes the mixture was cooled in ice-water and the dye filtered, washed with a little ethanol and ether, and dried in an oven. The crude dye (1.9 g.) was warmed with water (190 ml.) for 30 minutes at 80° C., filtered hot and washed with water, ethanol and ether, the product being obtained as brown crystals with a green reflex, M.Pt. 236–237° C. (d). The yield was 1.68 g., 58% theoretical.

The dye extends the sensitivity of a silver iodobromide emulsion to 735 mμ with a maximum at 705 mμ.

EXAMPLE 20

*2-amino pyrimidine methyl methosulphate*

2-amino pyrimidine (9.5 g.) was suspended in dry benzene (50 ml.) and treated with dimethyl sulphate (9.5 ml.), the mixture being refluxed for 3 hours on a water bath. A fluffy white solid began to separate rapidly. This was cooled in ice-water and filtered, ground with dry benzene, refiltered and dried in an oven. The product was obtained as a fluffy white solid, M.Pt. 130–133° C. The yield was 19.1 g., 86.4% theoretical.

EXAMPLE 21

*Bis 2-(3-ethyl benzothiazole) pentamethincyanine iodide*

2-methyl benzthiazole ethiodide (3.05 g. 2 mols.), 2-amino pyrimidine methyl methosulphate (1.105 g. 1 mol.) and ethanol (30 ml.) were mixed and warmed into solution on a water bath. Triethylamine (1.4 ml.) was added, an orange-pink colour developed, but was rapidly replaced by a blue-green as dye bumped out of solution. After refluxing the mixture for a further 30 minutes it was cooled in ice-water and the dye filtered, washed with a little ethanol and ether, and dried in an oven. The product was obtained as fluffy bright green crystals, M.Pt. 254.5–255° C. (d). The yield was 1.91 g., 73.7% theoretical.

EXAMPLE 22

*Bis 2-(3-ethyl benzothiazole) pentamethincyanine iodide*

2-methyl benzothiazole ethiodide (3.05 g. 2 mols.), 2-methylamino pyrimidine methiodide (1.255 g. 1 mol.) and ethanol (30 ml.) were mixed and warmed into solution on a water bath. Triethylamine (1.4 ml.) was added, a blue colour developed immediately and dye began to bump out of solution after another 5 minutes. After refluxing the mixture for a further 30 minutes it was cooled in ice-water and the dye filtered, washed with a little ethanol and ether, and dried in an oven. The crude dye (3.0 g.) was heated for 30 minutes at 80° C. with water (250 ml.), filtered hot and washed with cold water, ethanol and ether. This product (2.05 g.) was further purified by heating to boiling in ethylene glycol mono methyl ether (60 ml.), boiling for 30 minutes, then cooling slowly to 0° C. The dye was filtered, washed with ethanol and ether and dried, the product being obtained as green crystals with a bronze reflex, M.Pt. 260° C. (d). The yield was 1.75 g., 67.7% theoretical.

EXAMPLE 23

*Bis 2-(3-ethyl benzothiazole) pentamethincyanine iodide*

2-methyl benzothiazole ethiodide (1.45 g. 2 mols.), 2-methoxy pyrimidine methiodide (0.6 g. 1 mol.) and ethanol (15 ml.) were mixed and warmed into solution on a water bath. Triethylamine (0.7 ml.) was added, a feeble blue colour developed which slowly intensified during a reflux of 1 hour. The mixture was cooled in ice-water and the dye filtered, washed with a little ethanol and ether, and dried in an oven. The dye (0.065 g.) was warmed with water (6.5 ml.) for 30 minutes at 80° C., filtered hot and washed with a little ethanol and ether. The dye was further purified by warming with ethylene glycol mono methyl ether (5 ml.) for 30 minutes at 80° C., then cooled to 0° C. The dye was obtained as dark green crystals with a light green reflex, M.Pt. 243–245° C. (d). The yield was 0.005 g.

EXAMPLE 24

*Bis 2-(3-ethyl benzothiazole) pentamethincyanine iodide*

2-methyl benzothiazole ethyl ethosulphate (3.03 g. 2 mols.), 2-amino pyrimidine methyl methosulphate (1.105 g. 1 mol.) and ethanol (30 ml.) were mixed and warmed into solution on a water bath. Triethylamine (1.4 ml.) was added, a purple colour developed but changed to blue almost immediately. After refluxing the mixture for a further 30 minutes it was poured into hot aqueous 10% sodium iodide solution (30 ml.), the dye separating immediately. The mixture was cooled in ice-water and the dye filtered, washed with a little ethanol and ether, and dried in an oven. The crude dye (2.26 g.) was heated for 30 minutes at 80° C. with water (200 ml.), filtered hot and washed with cold water, ethanol and ether. This product (1.89 g.) was further purified by heating to boiling in ethylene glycol monomethyl ether (57 ml.), boiling for 30 minutes, then cooling slowly to 0° C. The dye was filtered, washed with ethanol and ether and dried, the product being obtained as green crystals with a light green reflex, M.Pt. 258.5° C. (d). The yield was 1.59 g., 61.4% theoretical.

EXAMPLE 25

*Bis 2-[3-(β-hydroxyethyl) benzothiazole]-γ-n-butyl pentamethincyanine iodide*

2-methyl benzothiazole β-hydroxy ethobromide (2.74 g. 2 mols.), 2-methyl-5-n-butyl pyrimidine methiodide (1.46 g. 1 mol.) and ethanol (30 ml.) were mixed and warmed into solution on a water bath. Triethylamine (1.4 ml.) was added, a purple colour developed but was replaced almost immediately by a green colour and dye began to bump out of solution after a few minutes. After refluxing the mixture for a further 30 minutes, the mixture, was cooled in ice-water and the dye filtered, washed with a little ethanol and ether and dried in an oven. The crude dye (1.46 g.) was boiled with methanol (146 ml.) for 15 minutes, the mixture cooled in ice-water and the product filtered and dried. The purified dye was obtained as dark green crystals with a bronze reflex, M.Pt. 242° C. (d). The yield was 0.75 g., 26.8% theoretical.

The dye extends the sensitivity of a silver iodobromide emulsion to 735 m$\mu$ with a maximum at 705 m$\mu$.

EXAMPLE 26

*Bis 2-(3-ethyl-6-phenyl benzothiazole) pentamethincyanine iodide*

2-methyl-6-phenyl benzothiazole (1.13 g. 2 mols.) and ethyl toluene-p-sulphonate (1.0 g. 2 mols.) were mixed and fused for 4 hours at 150° C. in an oil bath. The product was allowed to cool, and was treated with 2-amino pyrimidine methiodide (0.59 g. 1 mol.) and ethanol (30 ml.). The mixture was warmed into solution on a water bath and triethylamine (0.7 ml.) added. A blue colour developed and dye bumped out of solution after a few minutes; after refluxing for a further 20 minutes the mixture was cooled in ice-water and the dye filtered, washed with a little ethanol and ether and dried. The dye was obtained as dark green matted needles, M.Pt. 214–216.5° C. (d). The yield was 0.27 g., 15.1% theoretical.

The dye acts as a very feeble sensitiser, extending the sensitivity of a silver iodobromide emulsion to 745 m$\mu$ with a maximum at 725 m$\mu$.

EXAMPLE 27

*Anhydro bis 2-[3-($\beta$-carboxyethyl)-5-chlorbenzothiazole] pentamethincyanine hydroxide*

2-methyl-5-chlor benzothiazole $\beta$-carboxy ethochloride (2.92 g. 2 mols.), 2-amino pyrimidine methiodide (1.18 g. 1 mol.) and ethanol (30 ml.) were mixed and warmed into solution on a water bath. Triethylamine (2.8 ml.) was added, a blue colour developed rapidly and dye bumped out of solution immediately. After refluxing for a further 10 minutes the mixture was cooled in ice-water and the dye filtered, washed with a little ethanol and ether and dried in an oven. The crude dye (1.97 g.) was boiled with ethylene glycol mono methyl ether (60 ml.) for 30 minutes, cooled to 0° C. and filtered, the dye being then boiled with methanol (120 ml.) for 30 minutes. After cooling in ice-water and filtering, the dye was washed with methanol and ether and dried in an oven. The product was obtained as green crystals, M.Pt. 210–213° C. (d). The yield was 1.42 g., 51.9% theoretical.

EXAMPLE 28

*Bis 2-(3-ethyl-5-methyl benzothiazole) pentamethincyanine iodide*

2:5-dimethyl benzothiazole (1.63 g. 2 mols.) and ethyl toluene p-sulphonate (2.00 g. 2 mols.) were mixed and fused for 4 hours at 140° C. in an oil bath. The product was allowed to cool and was treated with 2-methylthio pyrimidine methiodide (1.34 g. 1 mol.) and ethanol (30 ml.). The mixture was warmed into soltuion on a water bath and triethylamine (1.4 ml.) added. A green colour developed immediately and dye bumped out of solution; after refluxing for 30 minutes the mixture was cooled in ice-water and the dye filtered, washed with ethanol and ether and dried in an oven. The crude dye (2.2 g.) was boiled with ethylene glycol mono methyl ether (65 ml.) for 30 minutes, then slowly cooled to 0° C. and filtered, washed with ethanol and ether and dried. The purified dye was obtained as dark green crystals with a light green reflex, M.Pt. 285–286° C. (d). The yield was 2.16 g., 73.2% theoretical.

The dye extends the sensitivity of a silver iodobromide emulsion to 735 m$\mu$ with a maximum at 710 m$\mu$.

EXAMPLE 29

*Bis 2-[3-($\beta$-phenylethyl)benzothiazole] pentamethincyanine iodide*

2-methyl benzothiazole (1.49 g. 2 mols.) and $\beta$-phenylethyl toluene p-sulphonate (2.79 g. 2 mols.) were mixed and fused for 3 hours at 140° C. in an oil bath. The product was allowed to cool and was treated with 2-amino pyrimidine methiodide (1.18 g. 1 mol.) and ethanol (20 ml.). The mixture was warmed into solution on a water bath and triethylamine (1.4 ml.) added. A blue colour developed; after refluxing for 1 hour the mixture was cooled in ice-water and the dye filtered, washed with a little ethanol and ether and dried. The crude dye (0.8 g.) was crystallised from methanol (150 ml.) as fluffy golden needles, M.Pt. 162–164° C. The yield was 0.30 g.

The dye extends the sensitivity of a silver iodobromide emulsion to 740 m$\mu$ with a maximum at 710 m$\mu$.

EXAMPLE 30

*Bis 2-(3-methyl thiazoline) pentamethincyanine iodide*

2-methyl thiazoline (1.01 g. 2 mols.) and methyl toluene p-sulphonate (1.86 g. 2 mols.) were mixed and fused for 3 hours on a water bath. The solid product was treated with 2-methylthio pyrimidine methiodide (1.34 g. 1 mol.) and ethanol (20 ml.) and the mixture warmed into solution. Triethylamine (1.4 ml.) was added, a magenta colour developed. After refluxing for 1 hour the mixture was cooled in ice-water and the dye filtered, washed with a little ethanol and ether and dried. The crude dye (1.05 g.) was crystallised from methanol (40 ml.) as charcoal-grey crystals with a metallic lustre, M.Pt. 223–225° C. (d). The yield was 0.62 g.

The dye extends the sensitivity of a silver iodobromide emulsion to 615 m$\mu$ with a maximum at 575 m$\mu$.

EXAMPLE 31

*Bis 2-(3:5-dimethyl-1:3:4-thiadiazole) pentamethincyanine iodide*

2:5 dimethyl-1:3:4-thiadiazole (1.14 g. 2 mols.) and methyl toluene-p-sulphonate (1.86 g. 2 mols.) were mixed and fused for 3 hours on a water bath. The product was treated with 2-methylthio pyrimidine methiodide (1.34 g. 1 mol.), ethanol (30 ml.) and the mixture warmed into solution. Triethylamine (1.4 ml.) was added, a blue colour developed. The mixture was refluxed for 1 hour, cooled in ice-water and the dye filtered, washed with a little ethanol and ether and dried. The crude dye (1.01 g.) was crystallised from methanol (150 ml.) as soft dark blue needles, M.Pt. 210–212° C. (d). The yield was 0.44 g. A second crop of dye was obtained from the reaction liquors by adding to 10% aqueous sodium iodide solution. The yield was 0.38 g.

The dye extends the sensitivity of a silver iodobromide emulsion to 665 m$\mu$ with a maximum at 640 m$\mu$.

EXAMPLE 32

*Bis 2-(3-ethyl benzothiazole) pentamethincyanine iodide*

2-methyl benzothiazole ethiodide (3.05 g. 2 mols.), 2-methyl pyrimidine methiodide (1.18 g. 1 mol.) and ethanol (30 ml.) were mixed and warmed into solution on a water bath. Triethylamine (1.4 ml.) was added, a blue-green colour developed and dye bumped out of solution. After refluxing for 30 minutes the mixture was cooled in ice-water and the dye filtered, washed with a little ethanol and ether and dried. The crude dye (2.62 g.) was heated for 30 minutes at 80° C. with water (200 ml.) and filtered hot, washed with a little ethanol and ether, and dried. The purified dye was obtained as fluffy green crystals with a bronze reflex, M.Pt. 262–263° C. (d). The yield was 2.30 g.

EXAMPLE 33

*Bis 2-(3-ethyl benzothiazole) pentamethincyanine iodide*

2-methyl benzothiazole ethiodide (3.05 g. 2 mols.), 2-phenyl pyrimidine methiodide (1.49 g. 1 mol.) and ethanol (30 ml.) were mixed and warmed into solution on a water bath. Triethylamine (1.4 ml.) was added, a blue-green colour developed and dye bumped out of solution. After refluxing for 30 minutes the mixture was cooled in ice-water and the dye filtered, washed with a little ethanol and ether and dried. The crude dye (2.60 g.) was heated for 30 minutes at 80° C. with water (200 ml.) and filtered hot, washed with a little ethanol and ether, and dried. The purified dye was obtained as fluffy green crystals with a bronze reflex, M.Pt. 262–263° C. (d). The yield was 2.28 g.

EXAMPLE 34

*Bis 2-(3-ethyl benzothiazole) pentamethincyanine iodide*

2-methyl benzothiazole ethiodide (3.05 g. 2 mols.), 2-benzylthio pyrimidine methobromide (1.485 g. 1 mol.) and ethanol (30 ml.) were mixed and warmed into solution on a water bath. Triethylamine (1.4 ml.) was added, a purple colour developed for a moment, then a blue-green colour appeared and dye bumped out of solution almost immediately. After refluxing for a further 15 minutes the mixture was cooled in ice-water and the dye filtered, washed with a little ethanol and ether, and dried. The crude dye (2.21 g.) was warmed with water (220 ml.) for 30 minutes at 80° C., filtered hot and washed with water, ethanol and ether, the solid being further purified by warming with ethylene glycol monomethyl ether (110 ml.) for 30 minutes at 80° C. The mixture was cooled to 0° C. and filtered, the dye being obtained as dark green crystals with a light green reflex, M.Pt. 249–251° C. (d). The yield was 1.9 g.

EXAMPLE 35

*Bis 2-(3-methyl benzoselenazole) pentamethincyanine iodide*

2-methyl benzoselenazole (0.98 g. 2 mols.) and methyl toluene-p-sulphonate (0.93 g. 2 mols.) were mixed and fused for 3 hours on a water bath. The product was treated with 2-amino pyrimidine methiodide (0.59 g. 1 mol.) and ethanol (10 ml.) and the mixture warmed into solution. Triethylamine (0.7 ml.) was added, a blue-green colour developed and some dye separated from the solution. After refluxing for 30 minutes the mixture was cooled in ice-water and filtered, washed with a little ethanol and ether and dried. The crude dye (0.41 g.) was crystallised from methanol (100 ml.) as dark green crystals, M.Pt. 263–264° C. (d). The yield was 0.08 g.

The dye is a very feeble sensitiser, extending the sensitivity of a silver iodobromide emulsion to 735 mμ with a maximum at 705 mμ.

EXAMPLE 36

*Bis 2-(3-methyl-4:5-diphenyl thiazole) pentamethincyanine iodide*

2-methyl-4:5-diphenyl thiazole (2.51 g. 2 mols.) and methyl toluene-p-sulphonate (1.86 g. 2 mols.) were fused for 3 hours at 140° C. in an oil bath. The product was treated with 2-amino pyrimidine methiodide (1.18 g. 1 mol.) and ethanol (20 ml.) and the mixture warmed into solution. Triethylamine (1.4 ml.) was added, a blue-green colour developed. After refluxing for 1 hour, the mixture was poured into 10% aqueous sodium iodide solution (20 ml.) and cooled in ice-water. The aqueous liquors were decanted and the residue stirred with hot benzene, dye crystallised on cooling and was filtered, washed with a little ethanol and ether and dried. The crude dye (1.08 g.) was crystallised from methanol (250 ml.) as dark green crystals, M.Pt. 250–251° C. The yield was 0.25 g.

The dye is a very feeble sensitiser, extending the sensitivity of a silver iodobromide emulsion to 760 mμ with a maximum at 725 mμ.

EXAMPLE 37

*Bis 2-(3-ethyl benzothiazole) γ-phenyl pentamethincyanine iodide*

2-methyl benzothiazole ethiodide (3.05 g. 2 mols.), 2-mehtylthio-5-phenyl pyrimidine methiodide (1.72 g.) and ethanol (30 ml.) were mixed and warmed into solution on a water bath. Triethylamine (1.4 ml.) was added, a blue-green colour developed and dye bumped out of solution. After refluxing for 45 minutes the mixture was cooled in ice-water and filtered, washed with a little water, ethanol and ether and dried. The crude dye (2.4 g.) was crystallised from methanol (100 ml.) as glistening green crystals, which change their crystalline form at 150–153° C. and M.Pt. 200° C. (d). The yield was 2.1 g.

The dye extends the sensitivity of a silver iodobromide emulsion to 720 mμ with a maximum at 700 mμ.

EXAMPLE 38

*Bis 2-(3-ethyl-5-phenyl benzoxazole) pentamethincyanine iodide*

2-methyl-5-phenyl benzoxazole (2.09 g. 2 mols.) and ethyl toluene-p-sulphonate (2 g. 2 mols.) were fused for 4 hours at 140° C. in an oil bath. The solid product was allowed to cool and was treated with 2-methylthio pyrimidine methiodide (1.34 g. 1 mol.), anhydrous potassium carbonate (3.45 g. 5 mols.) and ethanol (30 ml.). The mixture was warmed on a water bath for about 10 minutes with fairly vigorous shaking, an orange-yellow colour developed which fradually darkened and became reddish-purple. The mixture was cooled in ice-water and filtered, the filtrate being treated with a solution of potassium iodide (5 g.) in water (25 ml.). Some tarry material was precipitated, the aqueous layers were decanted and the residue stirred with a little methanol and ether. A small amount of dye separated and was filtered, washed with ether and dried. The crude dye was obtained as dark green crystals with a bronze reflex, M.Pt. 251–254° C. (d).

What we claim is:

1. Process for the production of pentamethincyanine dyes which comprises refluxing together, in the presence of a solvent and an acid binding agent, essentially one molecular equivalent of the pyrimidine quaternary salt of the formula:

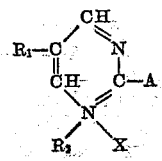

with essentially two molecular equivalents of the quaternary salt of the general formula:

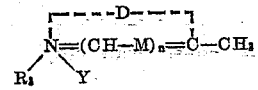

wherein $R_1$ is selected from the class consisting of hydrogen and alkyl groups containing up to 4 carbon atoms, phenyl and benzyl groups, $R_2$ is selected from the class consisting of alkyl groups containing up to 4 carbon atoms, phenyl and benzyl groups, $R_3$ is selected from the class consisting of alkyl, hydroxyalkyl and carboxyalkyl groups in which the alkyl groups contain up to 4 carbon atoms, phenyl, benzyl and phenyl-ethyl groups, A is selected from the class consisting of hydrogen, alkyl containing 1 to 4 carbon atoms, phenyl, alkoxy containing 1 to 4 carbon atoms, alkylthio containing 1 to 4 carbon atoms, benzylthio, amino and alkylamino containing 1 to 5 carbon atoms, M is selected from the class consisting of nitrogen atoms and —CH= groups, X and Y are each the anionic radical of an acid, D represents the atoms necessary to complete a ring selected from the class consisting of thiazole, oxazole, selenazole, benzthiazole, benzoxazole, benzselenazole, naphthathiazole, pyridine, qinoline, indolenine, diazines, diazoles and thiazoline, and $n$ is selected from nought and one.

2. Process according to claim 1 wherein the reaction is carried out in the presence of pyridine.

3. Process according to claim 1 wherein the reaction is carried out in the presence of acetic anhydride and tertiary amine.

References Cited in the file of this patent

UNITED STATES PATENTS

| | | |
|---|---|---|
| 1,863,679 | Wahl | June 21, 1932 |
| 2,094,580 | Brooker | Oct. 5, 1937 |
| 2,486,648 | Haury | Nov. 1, 1949 |

FOREIGN PATENTS

| | | |
|---|---|---|
| 425,609 | Great Britain | Mar. 12, 1935 |
| 435,252 | Great Britain | Sept. 16, 1935 |
| 560,160 | Great Britain | Mar. 22, 1944 |
| 796,789 | France | Jan. 27, 1936 |

OTHER REFERENCES

Konig et al.: J. Prakt. Chem. (2) vol. 87, pages 241 to 257 (1913).

Titherley et al.: J. Chem. Soc., vol 103, pages 331 to 334 (1913).

Elderfield: Heterocyclic Compounds, vol. 6, page 275, John Wiley and Sons (1957).

Hamer: Quarterly Reviews 1950 IV, pages 332–3.